June 28, 1955  N. R. BOICE, JR  2,711,615
APPARATUS FOR PROCESSING SURFACE AREAS
Filed March 29, 1951  9 Sheets-Sheet 2

INVENTOR
NELSON R. BOICE JR.

BY Cushman, Darby & Cushman
ATTORNEY

United States Patent Office 2,711,615
Patented June 28, 1955

2,711,615

APPARATUS FOR PROCESSING SURFACE AREAS

Nelson R. Boice, Jr., Miami Beach, Fla.

Application March 29, 1951, Serial No. 218,111

15 Claims. (Cl. 47—1)

The present invention relates to a new apparatus for processing surface areas. It is particularly suitable for use in agriculture, as for example, in the cultivation of crops or irrigation of lands, but uses in other fields are also contemplated.

One of the principal objects of the invention is to provide means which permit surface areas, particularly large tracts of land, to be processed much more rapidly and satisfactorily than has hitherto been possible.

Another object of the invention is to provide means for processing large surface areas under a wide variety of operating conditions with reduced labor costs, greater utilization of equipment and increased control.

Broadly stated, the above objects are realized, in accordance with one feature of the invention, by the utilization of a longitudinal arm or member which is adapted for carrying out whatever processing operations may be desired, the arm being mechanically guided over the surface being processed in accordance with one or another of a great number of predetermined patterns by being constantly pivoted first about one of its ends and then about the other at particular spaced points along the surface.

Where a longitudinal arm is employed for traversing surface areas, as in the present invention, it is preferable that the arm be made up of a plurality of sections flexibly connected together in end-to-end relationship so as to permit angular variations between adjacent sections. In this way, an arm of considerable length may be employed while at the same time allowing for the accommodation of surface variations along the entire arm length. As a practical matter, each of the sections forming such an arm should be provided with separate motivating units, and, in this event, it is desirable to provide means for controlling these units so as to maintain the flexibly connected sections of the arm substantially in longitudinal alignment, closely approaching a common vertical plane. Consequently, another important object of the invention is to provide such controlling means, the means employed being operable by the horizontal angular variation which may occur between adjacent sections of the arm.

The above objects as well as others not specifically set forth will be more apparent from the following detailed description of one form of the invention wherein reference is made to the accompanying drawings in which.

Figure 1:
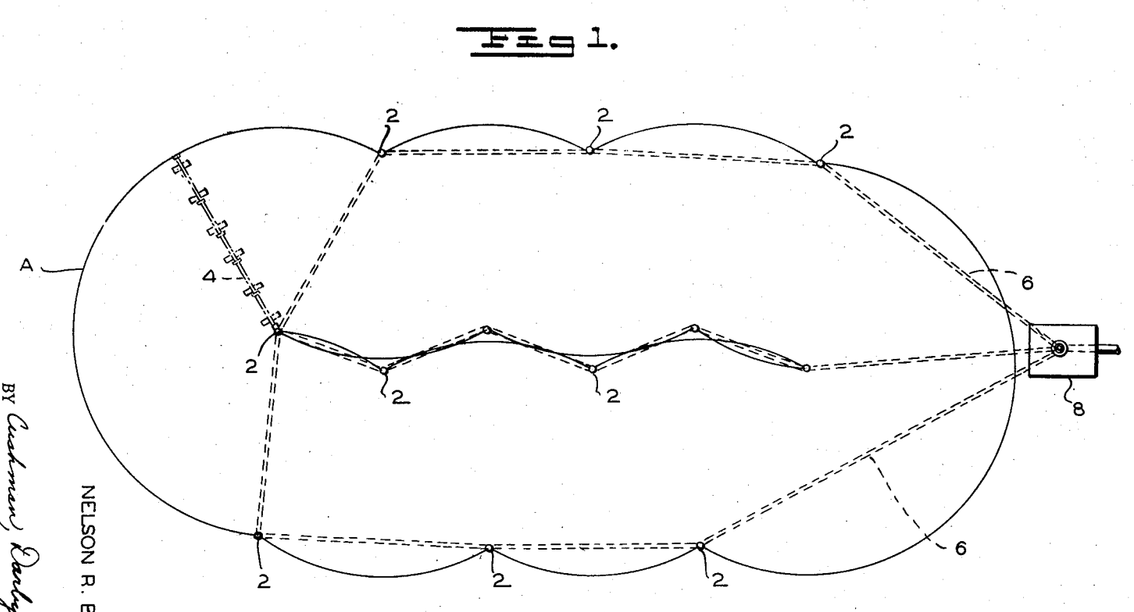
Figure 1 is a diagrammatic plan view of a suitable field layout embodying the present invention.
Figure 2:
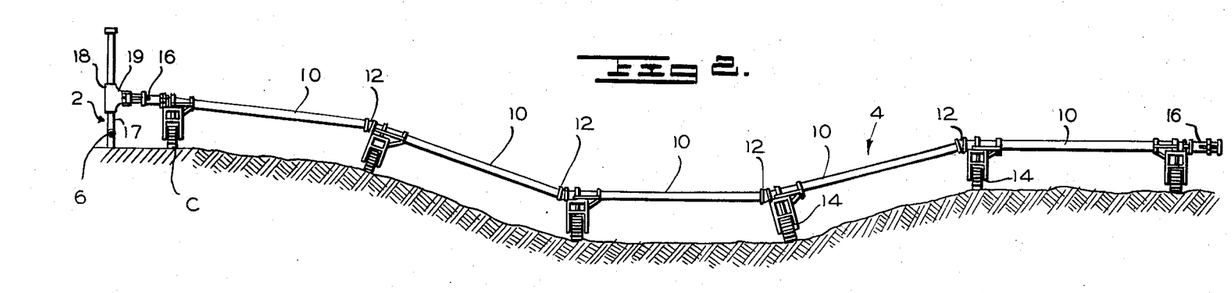
Figure 2 is a front elevational view of the longitudinal member or arm of the present invention, with parts removed for purposes of clarity, showing the manner in which vertical surface variations are accommodated.
Figure 3:
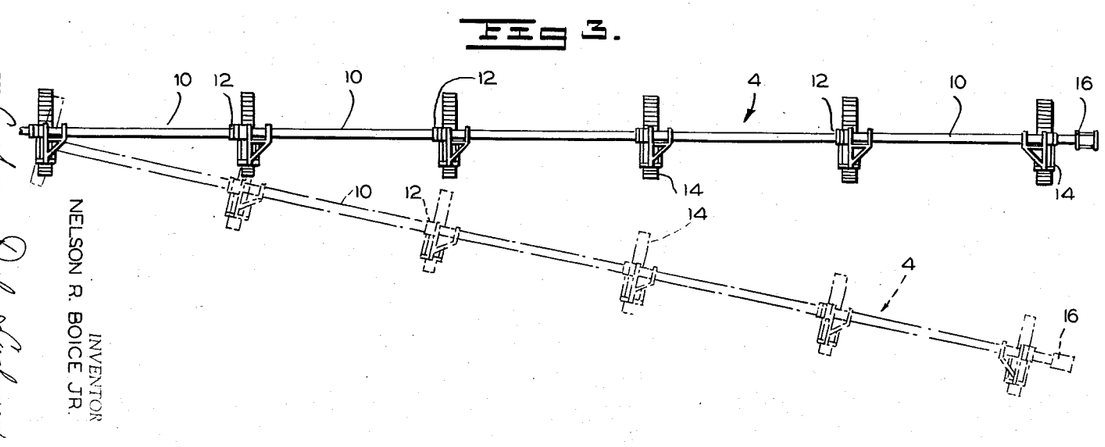
Figure 3 is a plan view of the longitudinal member showing in broken lines the manner in which the member is pivoted.

The invention can perhaps be best understood from a study of Figures 1–3. With particular reference to Figure 1, the field arrangement shown therein, which is given only for purposes of illustation and is not intended to limit the invention to the disclosed arrangement, includes a plurality of spaced pivot posts 2, which are fixed in the ground in predetermined positions, a longitudinal arm or member 4, which is provided with means of motivation and carries whatever equipment may be necessary for processing the land, and a piping system 6 which runs along the ground, or below the surface thereof, and connects each of the field posts with a central supply plant 8. The latter, although shown in Figure 1 at one end of the field, preferably should be located near the center of operation. Obviously, the nature of this plant depends upon the extent of the agricultural program being conducted. For example, it may be extremely simple, consisting solely of a motor and pump located at a source of water or it may also include a steam turbine electric generating plant, canning and freezing equipment or other facilities of an industrial nature. Alternatively, the plant 8 and piping 6 may be entirely eliminated.

As previously indicated, the arm 4 is guided over the ground for the purpose of cultivating, irrigating or otherwise processing the latter, in accordance with any desired pattern. This is accomplished by first connecting one of the ends of the arm to a post 2, the arm thereafter being motivated so that it pivots about this post until its free end reaches a second pivot post. The fixed end of arm 4 is then freed and the end which was originally free is connected to the second pivot post. The arm is then pivoted about this latter post and so on. In this manner, it will be understood that the arm 4 may be walked over the surface of the field, always attached to a field post 2 with first one end in motion and then the other.

In the particular arrangement of Figure 1, the longitudinal arm is shown just as it is reversing its direction to come back up the field towards the plant 8. As can be appreciated from the arc A showing the path of the free end of the arm, the latter, at this particular point, will move through an angle slightly greater than 180° but, once headed down the field, it pivots through only a comparatively small arc, as shown, the extent of this arc depending upon the number and spacing of the pivot posts. By carefully positioning the posts, virtually all of the ground can be covered although preferably the posts are so spaced that some small areas of the field are left uncovered to provide a pathway between the posts.

As shown in Figure 2, longitudinal arm 4 may be made up of a plurality of frames, preferably in the form of pipe sections 10, joined together in end-to-end relationship by means of flexible connections 12, the latter permitting angular deviations between adjacent sections both vertically, as shown in Figure 2, and horizontally.

For its movement over the ground, the member 4 is provided with motivating units 14, positioned at each flexible connection and at each end, the units being powered by means not shown in Figure 2 but fully described hereinafter, so that, when the member or arm is connected to a pivot post, the arm will be swung about the latter. The arm 4 is also provided at both of its ends with a post connector 16 for attachment to the pivot posts 2. These posts 2 are all similar to one another, being comprised of a vertical pipe section 17 which is rigidly fixed in the ground and carries at its upper end a T-shaped member 18 providing a horizontal outlet 19 for connection with the arm through the connector 16. In order that the T-shaped member 18 might pivot with the arm, it is threadedly secured to the section 17, this threaded connection also permitting the outlet 19 to be readily aligned with post connector 16 when connection with the arm 4 is necessary.

Pipe section 17 is preferably set in concrete with the latter extending outwardly from the post a distance sufficient to support the end motivating unit of arm 4 as shown at C in Figure 2. This assures that the post connector will always be at a substantially constant height at each post so that once the position of outlet 19 is established, it need not be substantially adjusted to make the desired connection.

Figure 12:
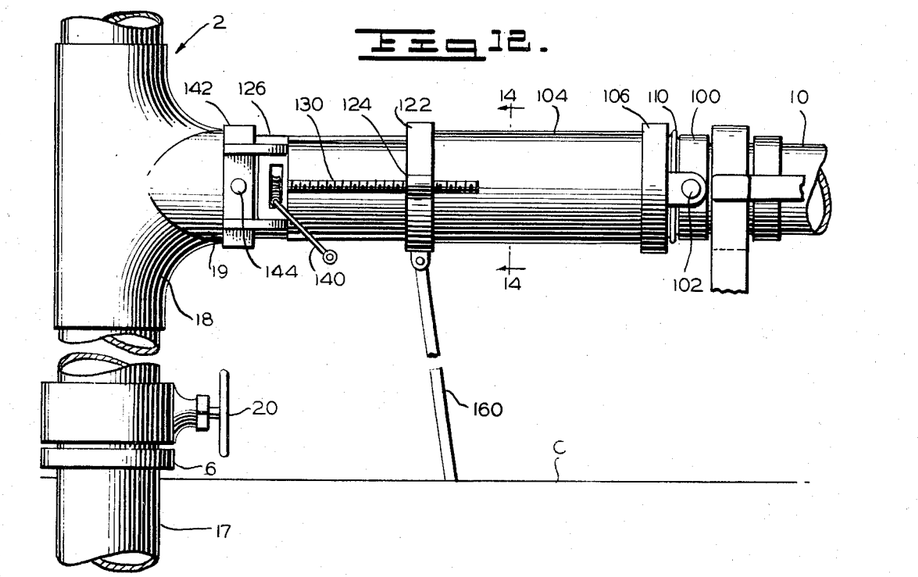
Figure 12 is a side elevational view of an assembly for connecting the arm for pivotal movement about one end.
Figure 13:
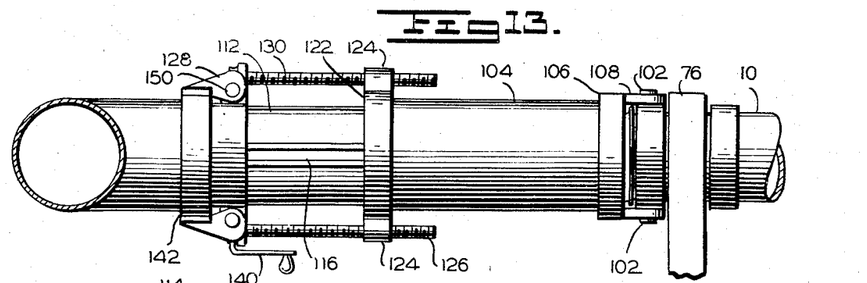
Figure 13 is a plan view of the connecting assembly shown in Figure 12.

As shown in Figure 2, the piping system 6 communicates with pipe section 17, same being provided with appropriate valve means 20 (Figure 12) for cutting the post into and out of communication with the system 6 so that, if desired, water, fertilizers, insecticides or other fluids in the liquid or gaseous state may be supplied to the arm for application to the ground.

As indicated above, flexible connections 12 permit the sections of the member 4 to act independently of one another in order that differences in the level of the ground can be accommodated. One appropriate form which this flexible connection may take is that shown in Figures 4–7. As will be seen from this portion of the drawings, the end of a section 10 threadedly carries a coupling or connector 22 to the outer end of which there is rigidly secured a collar, or hoop, 24. The latter is provided with a pair of diametrically opposed arms 26 which extend longitudinally over, and inwardly towards, the end of the adjacent section, which for purposes of clarity is designated by the numeral 10'. Collar 24 additionally includes a laterally extending projection comprised of two parts 28 and 30, the latter being so shaped as to provide an inwardly opening socket 32 when drawn together by the bolt connections 34. To complete the connection, another hoop or collar 36 is rigidly fixed about the end of section 10', this collar being provided with a ball 38 and a pair of rounded projections 40 which cooperate with socket 32 and arms 26, respectively.

Figure 4:
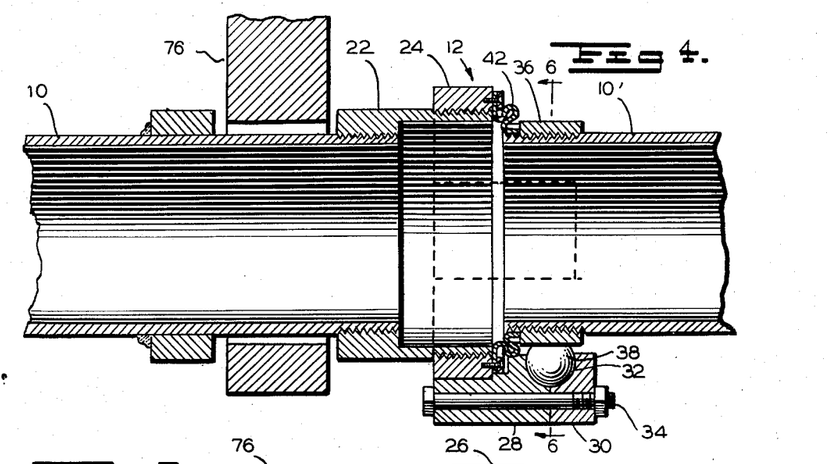
Figure 4 is a plan view of a central cross section of one assembly used for flexibly connecting the sections of the longitudinal member.
Figure 5:
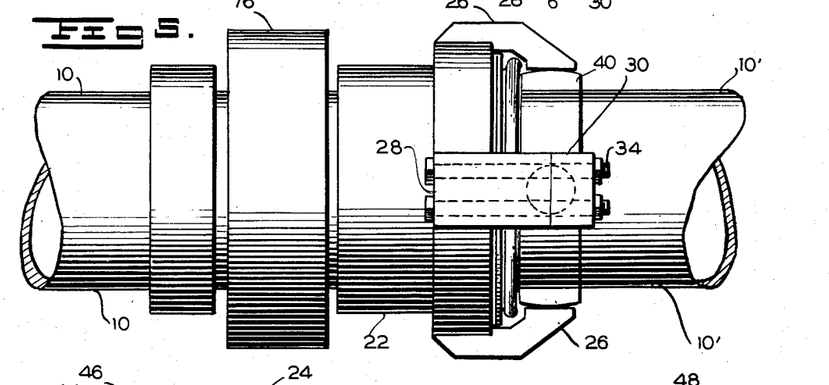
Figure 5 is a side elevational view of the assembly shown in Figure 4.
Figures 6, 7:
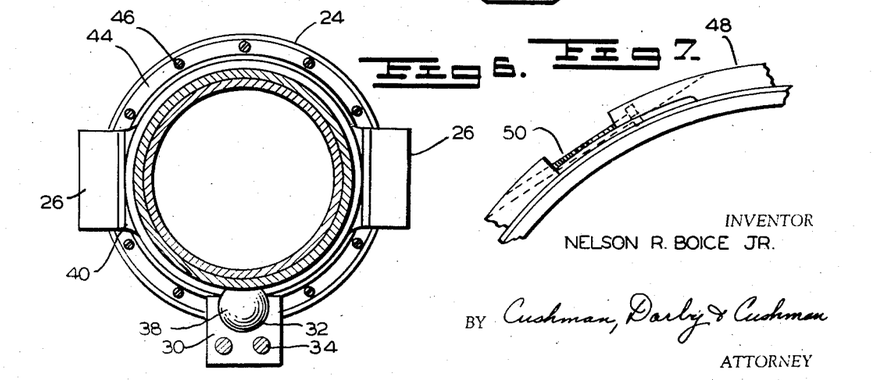
Figure 6 is a sectional view of the assembly taken along line 6—6 of Figure 4.
Figure 7 is a front elevational view of a portion of the assembly shown in Figures 4–6.
Figure 8:
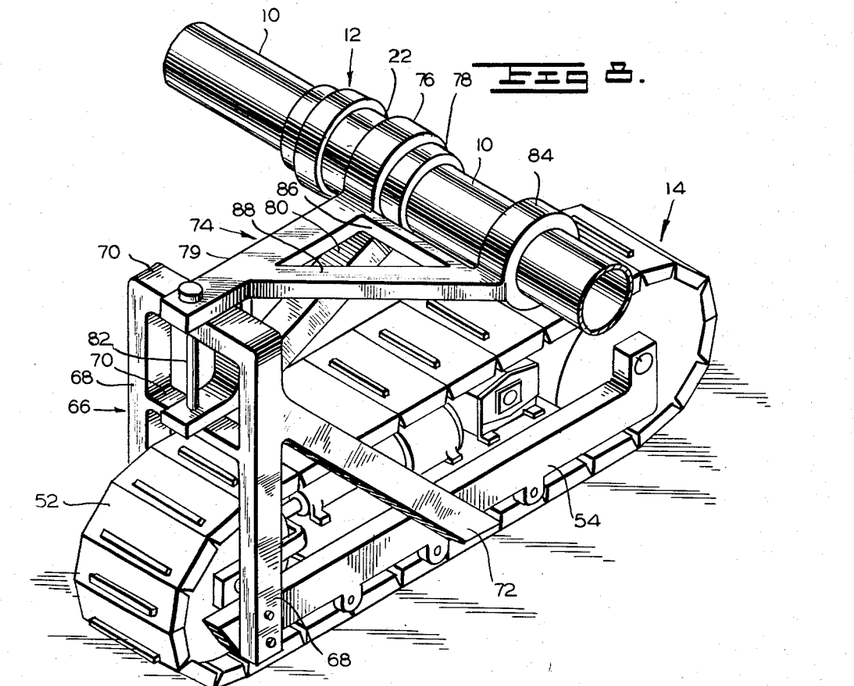
Figure 8 is a perspective view of an assembly for motivating the longitudinal arm.
Figure 9:
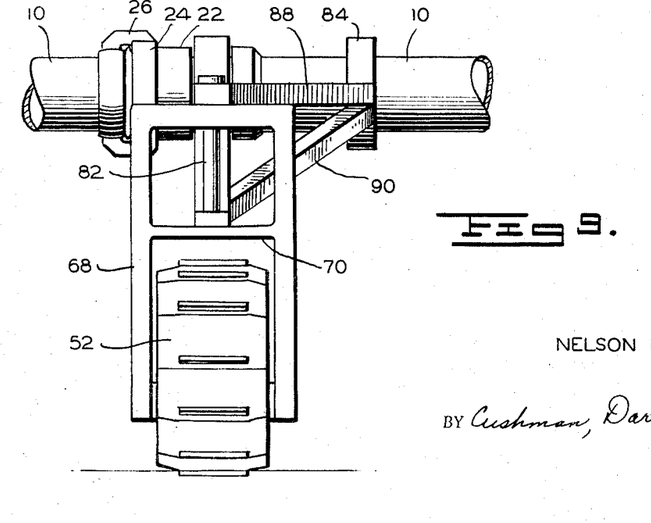
Figure 9 is a front elevational view of the assembly shown in Figure 8.
Figure 10:
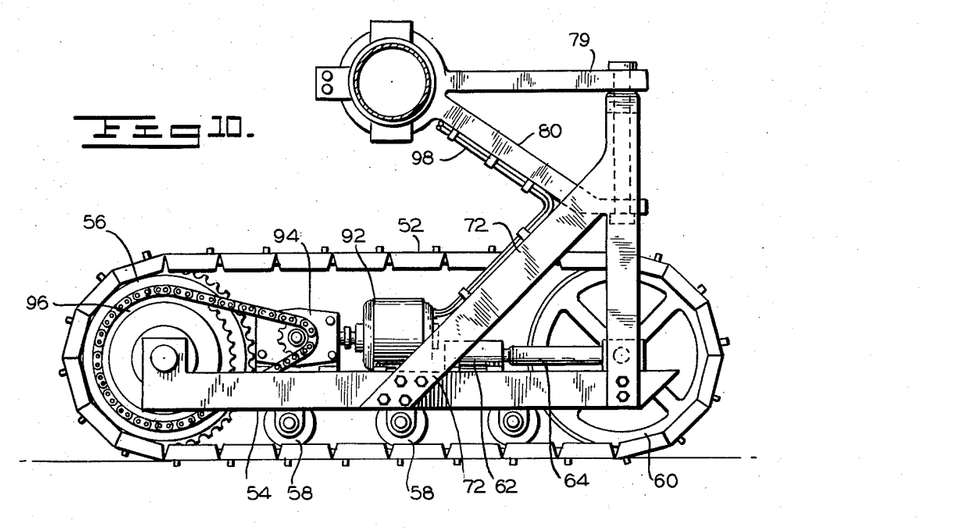
Figure 10 is a side elevational view of the assembly shown in Figure 8.
Figure 11:
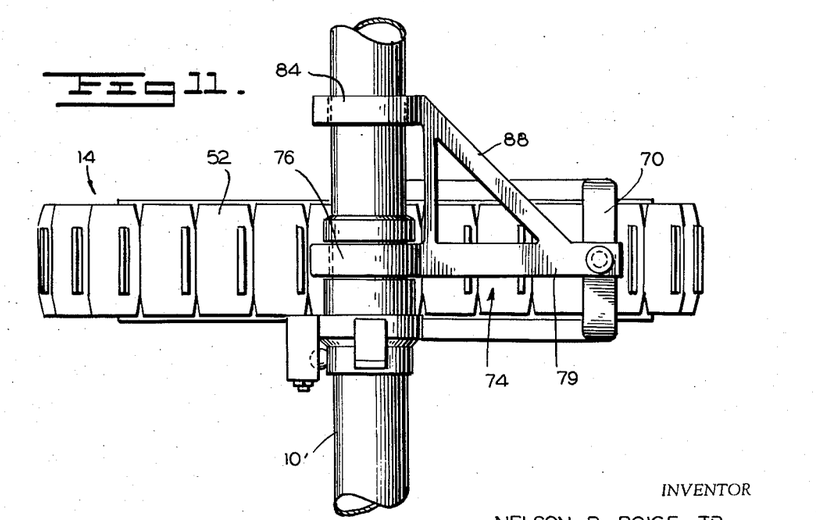
Figure 11 is a plan view of the assembly shown in Figure 8.

The connection as described operates in the following manner: Assuming that the end of section 10 opposite to that shown in Figures 4 and 5 is rising or falling because of a variation in the level of the ground, section 10 will pivot upon the ball 38, while, at the same time, the rounded projections 40 of hoop 36 will roll and slide along the arms 26. Similarly, when section 10 is moved horizontally, it will again pivot about ball 36 and the rounded surface of the projections 40 will slide along arms 26. The connection shown permits an angular change between connection 12 and the section 10 of about 30° in the vertical plane and about 14° in the horizontal plane. However, the invention is not limited to these degrees of flexibility, it being important only that the connection permits sufficient vertical change to accommodate virtually all conditions of terrain which might be encountered and sufficient horizontal angular change to activate the means for maintaining the frames or sections in longitudinal alignment as hereinafter described.

In order to insure a fluid tight connection between the adjacent sections, a sealing ring 42 of leather, or other suitable material, is also included in making connection 12. This ring 42 is secured in sealing position by clamping its outer edge between the collar 24 and a metallic clamping ring 44 held tightly against collar 42 by fastening screws 46, and its inner edge between the end of section 10' and a sealing clamp 48 placed about this end of the frame in abutting relationship with collar 36 and held securely in position by screw 50 (see Fig. 7). As shown, sufficient clearances are provided at all points so that the sealing material is not pinched through movement of the sections. Fluid pressure from within these sections serves to push the sealing material outwardly in the form of a gentle curve.

As the motivating units for arm 4, several different arrangements may be advantageously employed, power being supplied to these units in any of a number of ways. Thus, for example, each section of arm 4 could be provided with hydraulically powered wheels. Preferably, however, each section is supported upon, and motivated by, an electrically powered track in the manner of Figures 8–11. The track employed, as shown therein, is of conventional type, including the customary track chain 52, track frame members 54, rear drive sprocket 56, support idlers 58, and front idler wheel 60, the idler wheel being mounted in conjunction with the usual track tension spring 62 and yoke 64.

The assembly employed for supporting the section upon the track has two principal functions: first, it provides a comparatively even distribution of weight upon the track and, secondly, it permits the frame to steer the track through whatever slight changes of direction are necessary for the pivoted movement. These functions are accomplished by providing the track with a supporting structure 66 rigidly fixed to the track frame members 54 and extending upwardly therefrom. This structure 66 is comprised of a pair of vertical leg members 68, each of which is fixed to the forward end of a track frame member 54, a pair of horizontal segments 70 connecting leg members 68 above the forward end of the track, and a bracing member 72 extending rearwardly and downwardly from each of leg members 68 for attachment to a track frame member 54, at approximately the midpoint thereof.

Supporting structure 66 is connected to section 10, adjacent flexible connection 12, by means of a connecting structure 74 which includes a collar 76. This collar 76, as most clearly shown in Figure 4, fits loosely about section 10, being held in place by connector 22 and a collar 78 which is rigidly attached to section 10. The purpose of this loose fit is to permit the motivating unit 14 and supporting structures 66 and 74 to pivot or swing about the longitudinal axis of section 10 as necessary when traversing rolling terrain while, at the same time, enabling the arm itself to remain stationary with respect to any rotation about its longitudinal axis.

A pair of connecting members 79 and 80 extend outwardly from collar 76, each of these members being joined to one of the horizontal arms 70 of structure 66 by means of pin 82. Another collar 84 on structure 74 spaced from collar 76 by bracing member 86 fits loosely about section 10 in the same manner as collar 76 and for the same purpose, braces 88 and 90 extending outwardly therefrom to support the forward ends of the connecting members 79 and 80, respectively.

As is obvious from the above, the positioning of the pivotal connection ahead of the center of the ground engaging area of the track makes it possible to steer the latter by the exertion of lateral pressure thereon. Such pressure is, of course, exerted by the section itself when the arm is connected to a field post and the track motivated so that the section itself effects the necessary direction changes.

To drive track 14, an electric motor 92 is provided, the motor working through an appropriate gear reduction box 94 and chain and sprocket arrangement 96 to operate the track rear drive sprocket 56. Power to motor 92 is provided by an appropriate lead wire 98 which, as shown, may be extended upwards along structures 66 and 74 to section 10 at which point appropriate power controls are provided as hereinafter discussed.

As indicated above, a post connector 16 is provided at each end of the arm 4, the purpose of this connector being twofold, first, in combination with the fixed post, to guide the arm in its pivotal movement and, secondly, to provide a passage through which the various sections may communicate with the post and piping system 6 so that, for example, water or other fluid can be supplied to the ground.

A preferred form of post connector is that shown in Figures 12–20. As shown therein, the end section 10 of the arm 4 is provided, about its free end, with a rigidly attached hoop or ring 100 having a pair of diametrically opposed laterally projecting bosses 102. By means of these bosses, a cylindrical post connector body 104 is pivotally connected at one end to section 10, this being accomplished by the provision of a rigidly attached ring 106 about the end of body 104, ring 106 having a pair of outwardly extending arms 108 adapted to receive bosses 102. As is apparent, this pivotal connection between the post connector body 104 and section 10 permits movement between these members in a vertical plane only, the connection being made fluid tight in the manner discussed above with respect to the frame connection 12, i. e., by the utilization of a ring of flexible sealing material 110 snugly connected at opposite edges to the post connector body 104 and section 10.

Figure 14:
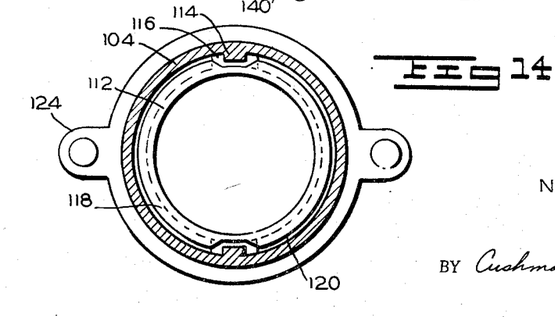
Figure 14 is a sectional view taken along the line 14—14 of Figure 12.
Figure 15:
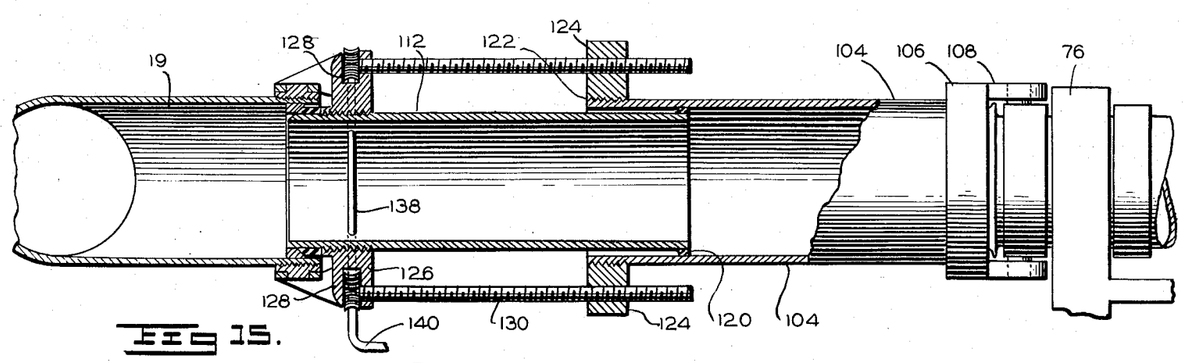
Figures 15 and 16 are plan views of the connecting assembly shown in Figure 12 with parts broken away.
Figure 16:
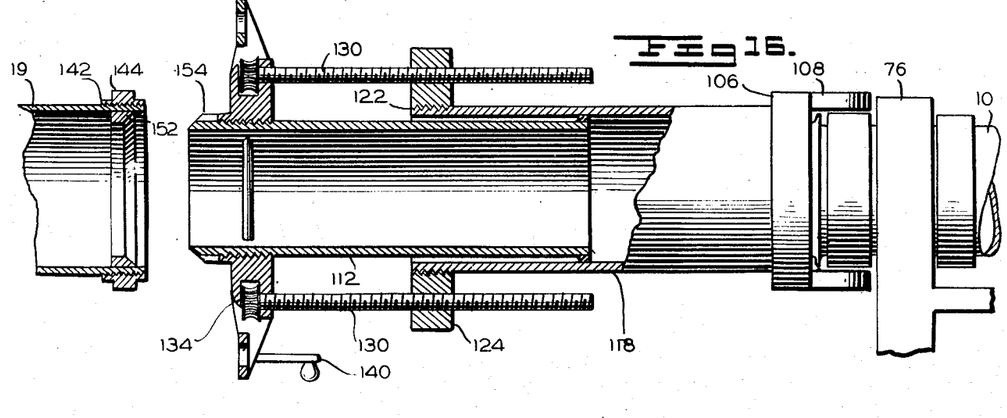

Slidably mounted within the outer end of connector body 104 is a splined cylindrical body 112. For this purpose, the interior surface of the post connector body is provided, as shown in Figure 14, with longitudinally extending diametrically opposed tongues 114, the latter being received within raised grooves 116 provided on body 112. The inner end of the cylindrical body 112, that is, the end which is mounted in post connector body 104, is built up with a plate member 118 to fit the inside diameter of the post connector body 104, and in conjunction with a packing seal 120, permits a complete liquid seal to be obtained between the sliding parts.

Figure 17:
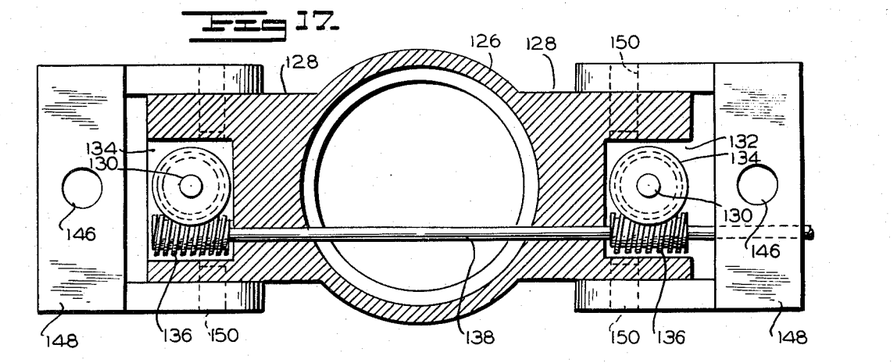
Figure 17 is a detailed sectional view of a portion of the connecting assembly shown in Figure 12.

A rigidly fixed ring 122 is provided about the outer end of the post connector body 104, ring 122 having a pair of diametrically opposed projections 124, one on each side. Similarly, the outer end of splined cylindrical body 112 has firmly secured thereto a ring 126 having a pair of laterally extended projections 128, one on each side and disposed in alignment with the projections 124. Each of the latter projections 124 threadedly receives one end of a screw rod 130, the outer end of the screw rod being rotatably supported in the similarly positioned, non-threaded projection 128 of ring 126. Projections 128 are slotted as indicated by the numerals 132, so that each may receive an appropriate worm gear 134, each of these gears being rigidly connected to a screw rod 130. These worm gears 134 each mesh with appropriate worms 136 (Fig. 17), positioned within the slots 132, the worms being connected together by means of a rod or shaft 138 which extends through the splined cylinder body 112, as seen in Fig. 17, and is provided with an externally positioned operating crank 140. Obviously, by turning the latter, screws 130 may be operated to move the cylinder body 112 further within, or outwardly from, the post connector body 104 so that the length of the connector may be varied to accommodate variations which might occur in the distance between the post outlet 19 and the end of the arm 4. Also, after a connection is made, the position of the arm with respect to the post may be adjusted as required by turning crank 140. In this way, the arm may be adjusted to insure an accurate ground track if this is required for the operations being carried out.

For attachment to the post connector, the pivot post is provided about the outer end of its horizontal outlet 19 with a hoop 142 having a pair of diametrically opposed laterally projecting bosses 144. These bosses are adapted to be received by sockets 146 which are provided in connecting arms 148, the latter being pivotally mounted upon the cylinder body projections 128 by means of pins 150. With this arrangement, the arms 148, may be swung inwardly towards, or outwardly from, the outlet 19 so as to be engaged or disengaged, respectively, with the post bosses 144. To assist in this operation, suitable spring mechanisms (not shown) may also be provided for forcing the connecting arms from any intermediate position into the extreme inward connecting position or the extreme outward disconnected position.

Figure 18:
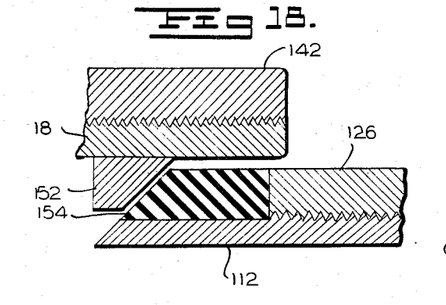
Figure 18 is an enlarged detailed sectional view of a portion of the connecting assembly of Figure 12, before the parts are brought into sealing relation.
Figure 19:
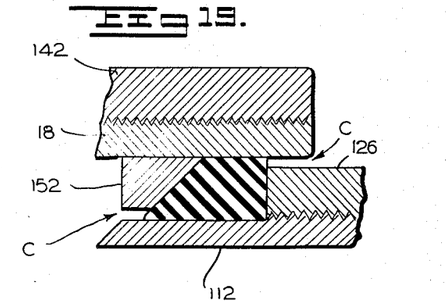
Figure 19 is an enlarged detailed sectional view of that portion of the connecting assembly shown in Figure 18 with the parts brought into sealing relation.

Means specifically shown in Figures 18 and 19 are also provided for rendering the post connection fluid tight. These means include an abutment ring 152 rigidly secured within the post outlet 19 and a sealing ring 154, such as for example, rubber or other suitable flexible material, positioned about the end of cylinder body 112 in abutting relationship with hoop 126. Before the post connection is made, the cooperating parts take the position shown in Figure 18, sealing ring 154 being distorted as shown in Figure 19 to form a tight joint when the connection is completed. As indicated by the letter C, suitable clearances are provided in order to accommodate vertical angular changes of the arm. However, the connection does not permit any horizontal angular variation between the connector and the post outlet 19 nor any turning of the arm about its longitudinal axis.

Figure 20:
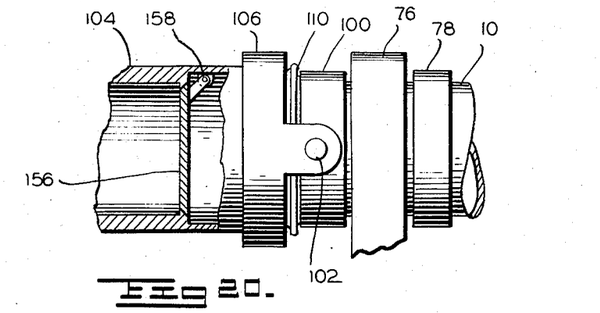
Figure 20 is a detailed sectional view of another portion of the connecting assembly of Figure 12.

In order to prevent leakage of fluid through the free end of the arm, the post connector body 104 is provided, as shown in Figure 20, with a check valve 156 which is pivotally mounted upon pin 158. As is apparent, this valve permits flow of fluid from the post through the connector to the arm but does not allow for flow in the reverse direction.

The connector 16 is provided with a bracing member 160, the latter being pivotally connected to ring 122 of connector body 104. In operation, this bracing member 160 serves two purposes, first, it may be used when in the position shown in Figure 12, to support the post connector at a desired height thereby facilitating connection to the post outlet and, secondly, it may be used to support the connector and prevent its end from falling too close to the ground when the post connector 16 is at the pivoting end of the arm, this latter function being accomplished by retracting the member 160 upwardly into a suitable mounting (not shown) on the track.

The arrangement described above operates in the following manner:

Assuming that the arm is in motion about a post so that the post connector 16 is located at the free end of the arm 4, brace 160 is supported in a retracted position, cylinder body 112 is retracted within post connector body 104 and the connecting arms 148 are pivoted into an outward position. When the connector reaches a position in approximate alignment with post outlet 19, power to the arm is shut off. The preferred arrangement for supplying power to the unit is subsequently described and, for the present purpose, it will suffice to say that by proper manipulation of the power controls, the connector may be brought into longitudinal alignment with the post outlet.

Inasmuch as the various sections constituting the longitudinal arm 4 may at this point rest upon uneven terrain, the end of cylinder body 112, although longitudinally aligned with the post outlet, may be considerably above or below the outlet. Consequently, the brace 160 is withdrawn from its retracted position to a position such as that shown in Figure 12, the lower end of brace 160 being placed in a position where substantially perfect vertical alignment with the post outlet is obtained.

After the connector and post outlet have been thus aligned, the crank handle 140 is turned so as to move the cylinder 112 outwardly from the post connector 104 towards the post outlet. Needless to say, the cylinder body 112 should be of sufficient length to bridge the maximum clearance which might possibly occur between connector 16 and post outlet 19. It has been found that the utilization of a cylinder body which can accommodate a clearance of 8½" is normally sufficient to insure successful operation of the arm although this distance will vary, depending upon a number of factors, among the most important of which are the nature of the terrain, length of the arm, repetitive accuracy of ground track required and accuracy of initial installation or adjustments thereto.

As the crank handle 140 is turned, the flexible sealing material 154 on the end of cylinder body 112 contacts the abutment member 152 and becomes distorted, to provide the liquid seal, as previously described, the turning of the handle being continued until cylinder body 112 has been forced into the post outlet a sufficient distance to make a proper connection. The arms 148 are then swung inwardly into engagement with the bosses 144 thus completing the post connection. Brace 160 is then again retracted so that it will not drag along the ground as the arm pivots about the field post and, if fluid is to be supplied to the ground, valve 20 opened to bring the arm into communication with the piping system 6. Power is then supplied to the mounts 14 so that the arm may be pivoted about the post. Crank 140 can then be operated to make any adjustment which may be required between the relative position of the post and arm. The length of time before the post connection is broken and another made is dependent, of course, upon the length of the arm being used, the post layout, and the speed at which the arm is set to travel. However, when the free end of the arm does reach a position approximately in alignment with another pivot post, the arm is again stopped, either manually or by automatic means, and the fixed end of the arm disconnected. This is accomplished by first shutting off post valve 20 and thereafter turning the hand crank 140 a slight amount in whichever direction is necessary to relieve the tension which may exist between the bosses 144 and connecting arms 148. After this tension is relieved, the arms are then swung into outward position free of the bosses and the crank is turned until the cylinder body 112 has been retracted a distance sufficient to clear post outlet 19. The other end of the arm is then connected in the manner described above.

As indicated above, where an arm having separately motivated sections is employed, it is desirable to provide means for controlling the power applied to the motivating units in order that the sections may be kept in longitudinal alignment, that is, in substantially the same vertical plane. According to the present invention, this is accomplished by the utilization of the horizontal angle occurring between adjacent sections. In other words, if for some reason a horizontal angle other than 180° should occur between two adjacent sections of the arm, a change is effected in the power delivered to the mounts so as to bring about longitudinal alignment of the frames.

Figures 21, 23:
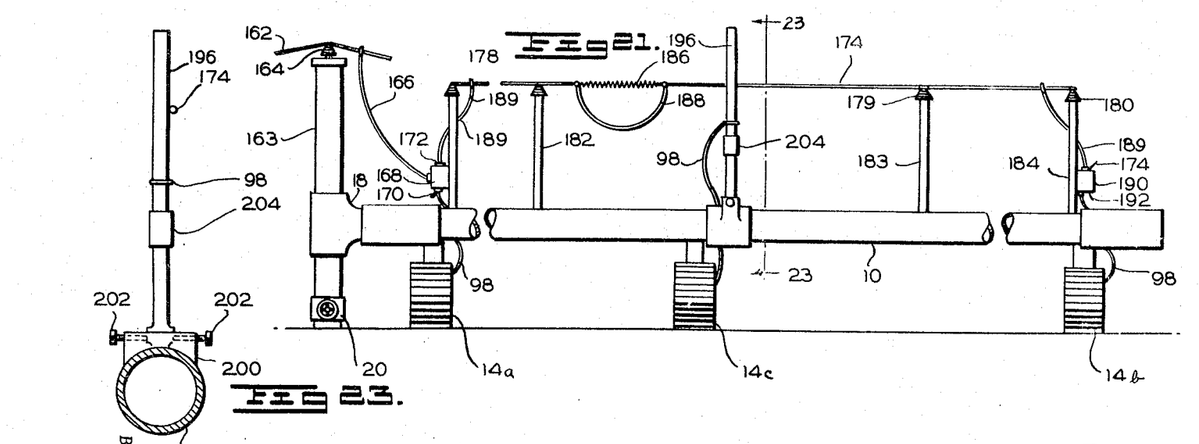
Figure 21 is a front elevational view of an assembly for supplying power to the longitudinal arm.
Figure 23 is a sectional view taken along line 23—23 of Figure 21.
Figure 22:
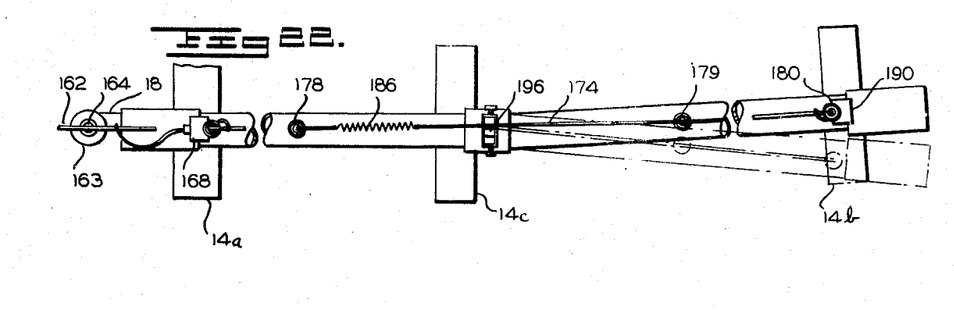
Figure 22 is a plan view of the arrangement shown in Figure 21.

Various arrangements utilizing the horizontal angle for controlling power delivered to the motivating units may be adapted for maintaining the arm sections longitudinally aligned. However, a preferred arrangement utilizing electric power is shown in Figures 21–23, the arm shown therein including only two sections and one intermediate motivating unit although, in actual practice, the arm may, of course, include any number of sections and units.

In the particular arrangement shown, power is supplied to each pivot post by means of a main power line 162 which runs from post to post. For this purpose, each post may include a vertical extension 163, appropriately insulated as indicated at 164, to which power line 162 is connected. Power is supplied to the arm by means of power lead 166 which is plugged into a switch box 168 provided with two switches, 170 and 172. Switch 170, which controls the power from lead 166 to the innermost motivating unit, designated as 14(a) for purposes of clarity, is provided with three positions, namely, "off," "forward" and "backward." When the arm is connected as shown, switch 170 is in the "off" position since the movement of the adjacent unit is sufficient to pull unit 14(a) about the post for the short distance it must travel. Obviously, the "forward" and "backward" switch positions may be utilized when a post connection is to be made, to manipulate the unit through its power connection 98 to bring the post connector 16 into longitudinal alignment with the properly positioned horizontal outlet 19 of the post 2.

Switch 172 controls the power from the lead 166 to the unit field line 174 by means of which power is supplied to the remaining units. Line 174 is stretched tightly between insulators 178, 179 and 180, which are fixed atop spaced vertical posts 182, 183 and 184 respectively, the latter being rigidly attached to the various sections of the arm. Line 174 is kept taut by means of a spring 186 by-passed with an appropriate connecting line 188. Leads 189 serve to connect line 174 with both switch box 168 and a similar switch box 190 located at the other end of the arm.

The motivating unit at the free end of the arm, designated as 14(b), regulates the rate of movement of the intermediate unit. In other words, electric power is constantly applied to this track and the movement of the intermediate track, designated as 14(c) depends entirely upon the speed of track 14(b).

Power is supplied to this latter unit through its connection 98 by operation of switches 192 and 194, which correspond with switches 170 and 172, respectively, of switch box 168. In this particular case, however, switch 194 is not only in the "on" position but switch 192 in contrast to switch 170, is in the "forward" position.

In contrast to unit 14(b) which is continually supplied with power, the intermediate unit 14(c) is only intermittently operated dependent upon whether or not the sections of the arm are in longitudinal alignment. Briefly, this is accomplished by providing the frame connector 12 with an upstanding antenna bar 196 which, when the sections are in alignment, contacts power line 174 to thereby provide unit (14(c) with power through its lead 98. Similarly, antenna bar 196 contacts the power line 174 and therefore provides power to unit 14(c) when the latter lags behind unit 14(b) in the manner shown by the broken lines in Figure 22. On the other hand, if unit 14(c) should go ahead of unit 14(b), antenna bar 196 immediately breaks contact with the power line 174 and no power is supplied to unit 14(c) until unit 14(b) becomes so positioned that antenna bar 196 again contacts power line 174. Obviously, when power is applied to unit 14(c), it should be such as to insure that the rate of speed of unit 14(c) is great enough to maintain its proper position relative to unit 14(b) despite differences in terrain.

From the above, it will be appreciated that, by proper adjustment of the antenna bar 196, the various sections of the arm may be kept substantially in longitudinal alignment. To permit ready adjustment of the bar, the frame connector is provided, as shown in Figure 23, with an upwardly directed projection 200 which is slotted to receive the T-shaped lower end of bar 196. Positioned within the projection 200, on either side of the bar, are adjusting screws 202, the turning of which will obviously shift or slide the bar horizontally closer to, or away from, power line 174. Preferably, there is also provided on antenna bar 196, an insulator 204.

In order to be certain that bar 196 will contact the power line 174 when the latter rises or falls with respect to it as the arm 4 travels over uneven terrain, the antenna bar should be of considerable length, as shown in Figure 21. Up and down motion of the arm will, of course, also cause a variation in the distance between the insulators 178, 179 and 180 but spring 186 permits the line 174 to accommodate this variation while at the same time remaining taut.

While in the arrangement described above, power is supplied intermittently to the intermediate motivating unit to maintain alignment of the sections, continuously running motors could be equally as well employed, the electrical impulses obtained from horizontal angular variation being used to activate a solenoid operated clutch or other suitable device. Alternatively, a mechanical device working a clutch or other similar apparatus operable by virtue of the horizontal angle occurring between adjacent sections could be also substituted for the arrangement described. Similarly, while the horizontal angle power controlling means have been described in association with an arm adapted for pivotal movement it will be understood that the fundamental principle thereof is equally applicable with a longitudinal member adapted for non-pivotal movement, for example, a rail or trolley guide arms.

From the foregoing description, it is thought that the various uses and advantages of the present development, and obvious modifications thereof, are clearly apparent. Thus, the invention may be used for carrying out a wide variety of agricultural functions at reduced cost, greater utilization of equipment and increased control over crops, land and growing conditions. Tremendous areas may be readily processed and, because the arm will always make substantially the same ground tracks from any given point, tools can be set to work very closely and accurately with respect to the stem or other portions of a growing plant.

Any farm implement normally pulled by a tractor can be attached to the arm for movement over the area being processed. Furthermore, many pieces of equipment may be attached simultaneously at desired points along the sections of the arm and these implements need not all be of the same kind.

The invention is particularly advantageous for use in the irrigation of land or in the application of soluble fertilizers and agricultural sprays to the ground. Similarly, the invention may be used for spraying crops with steam in the event of frost. In fact, any fluid, whether liquid or gaseous, or any solid that is capable of suspension, can be distributed with the aid of the suitable section attachments. Furthermore, many additional uses may be found for the invention, other than those enumerated above, under special conditions of crop, terrain, and climate and, besides its agricultural functions, the invention may be suitably employed in other fields, such, for example, as the polishing and sweeping of floors.

As indicated, various modifications may be made in the apparatus hereinbefore described. Thus, for example, instead of utilizing electric power for motivating the longitudinal arm, the latter may be operated by hydraulic pressure, steam, an internal combustion engine or any combination of these arrangements. Similarly, modifications can be made in various other features of the invention without in any way deviating from the invention, as defined in the following claims.

I claim:

1. Apparatus for traversing a surface area comprising a plurality of spaced pivot members fixed in said surface, a longitudinal member comprised of a plurality of elongated sections pivotally connected together in end-to-end relationship to permit angular variations between adjacent sections, means for motivating said longitudinal member to move the latter transversely of its length, and means at both ends of said longitudinal member for pivotal connection with said pivot members, said pivot members being so spaced from one another that said longitudinal member may be moved over said surface along a predetermined pattern by pivotal movement thereof of sequentially about said pivot members with first one end of said longitudinal member connected to a pivot member, and then the other end connected to the other pivot member.

2. Apparatus for processing surface areas comprising a plurality of spaced pivot members fixed in said surface, a longitudinal member having means thereon for performing the necessary processing operation, said longitudinal member being comprised of a plurality of elongated sections flexibly connected together in end-to-end relationship to permit angular variations between adjacent sections, means for motivating said longitudinal member and means at both ends of said longitudinal member for pivotal connection with said pivot members, said pivot members being so spaced from one another that said longitudinal member may be moved over said surface along a predetermined pattern by pivotal movement thereof sequentially about said pivot members with first one end of said longitudinal member connected to a pivot member, and then the other end connected to the other pivot member.

3. Apparatus for processing surface areas comprising a plurality of spaced pivot members fixed in said surface, a longitudinal member having means thereon for performing the necessary processing operation, said longitudinal member being comprised of a plurality of elongated sections flexibly connected together in end-to-end relationship, to permit angular variations between adjacent sections, means for motivating said member positioned adjacent each flexible connection, connecting means at both ends of said longitudinal member for pivotal connection with said pivot members, said pivot members being so spaced from one another that said longitudinal member may be moved over said surface along a predetermined pattern by pivotal movement thereof sequentially about said pivot members with first one end of said longitudinal member connected to a pivot member, and then the other end connected to the other pivot member and means dependent upon the horizontal angular disposition of said sections for controlling the operation of said motivating means.

4. Apparatus for processing surface areas comprising a plurality of spaced pivot members fixed in said surface, a longitudinal member having means thereon for performing the necessary processing operation, said longitudinal member being comprised of a plurality of elongated sections flexibly connected together in end-to-end relationship, to permit angular variations between adjacent sections, separate motivating means for each of said sections, connecting means at both ends of said longitudinal member for pivotal connection with said pivot members, said pivot members being so spaced from one another that said longitudinal member may be moved over said surface along a predetermined pattern by pivotal movement thereof sequentially about said pivot members with first one end of said longitudinal member connected to a pivot member, and then the other end connected to the other pivot member, and means dependent upon the horizontal angular disposition of said sections for controlling the operation of said motivating means.

5. Apparatus for processing surface areas comprising a plurality of spaced pivoted members fixed in said surface, a longitudinal member having means thereon for performing the necessary processing operation, said longitudinal member being comprised of a plurality of elongated sections flexibly connected together in end-to-end relationship, to permit angular variations between adjacent sections, means for motivating each of said sections, connecting means at both ends of said longitudinal member, for pivotal connection with said pivot members, the latter members being so spaced from one another that said longitudinal member may be moved over said surface along a predetermined pattern by pivotal movement thereof sequentially about said pivot members with first one end of said longitudinal member connected to a pivot member, and then the other end connected to the other pivot member, said section motivating means comprising a driven support for each section, the latter being pivotally connected to said support ahead of the center of the ground engaging area whereby said section may direct the course of said support when the latter is driven.

6. Apparatus as claimed in claim 1 wherein the elongated sections of said longitudinal member are flexibly connected together by means comprising a pair of arms and a socketed projection positioned in spaced relationship about the end of one of said sections, and extending outwardly therefrom, a pair of outwardly projecting members on the adjacent section end slidably cooperable with said arms and another outwardly projecting member on said adjacent section end pivotally receivable within said socketed projection.

7. Apparatus for processing surface areas comprising a plurality of spaced pivot members fixed in said surface, a longitudinal member having means thereon for performing the necessary processing operation, said longitudinal member being comprised of a plurality of elongated sections flexibly connected together in end-to-end relationship to permit angular variations between adjacent sections, means for motivating said longitudinal member comprising a plurality of driven supports positioned at each end of said longitudinal member and intermediately of the ends thereof adjacent each flexible connection, connecting means at both ends of said member for pivotal connection with said pivot members, and means operable by horizontal angular variation between adjacent sections for controlling the operation of the intermediately positioned supports, said pivot members being so spaced from one another that said longitudinal member when motivated may be moved over said surface along a predetermined pattern by pivotal movement thereof sequentially about said pivot members with first one end of said longitudinal member connected to a pivot member, and then the other end connected to the other pivot member.

8. Apparatus as claimed in claim 7 wherein said supports are electrically operated, the means for controlling movement of the intermediately positioned support comprising a power line spaced from, and extending lengthwise of, said longitudinal member, and an outwardly extended contacting member operatively associated with said intermediately positioned support and positioned to intermittently connect, and disconnect, said support and said power line dependent upon horizontal angular variation occurring between sections adjacent said support.

9. Apparatus for traversing a surface area comprising a plurality of spaced pivot members fixed in said surface, a longitudinal member, means for motivating said longitudinal member to move the latter transversely of its length, and means at both ends of said longitudinal member for pivotal connection with said pivot members, each of said pivot members having at least one other pivot member spaced therefrom a distance equal to the length of said longitudinal member, whereby said longitudinal member may be moved over said surface along a predetermined pattern by pivotal movement thereof sequentially about said pivot members with first one end of said longitudinal member connected to a pivot member, and then the other end connected to the other pivot member.

10. Apparatus as claimed in claim 9 wherein said means for pivotally connecting said longitudinal member with said pivot members comprise a connector body attached to one end of said longitudinal member and extending longitudinally therefrom, a cylindrical body extending outwardly from said connector body, said cylindrical body having its inner end slidably mounted within said connector body for adjustment longitudinally thereof and arms pivotally mounted adjacent the outer end of said cylindrical body for connecting the latter with said pivot members.

11. Apparatus as claimed in claim 9 wherein said means for pivotally connecting said longitudinal member with said pivot members comprise a connector body attached to one end of said longitudinal member, a cylindrical body extending outwardly from said connector body, said cylindrical body having its inner end slidably mounted within said connector body, a screw rotatably mounted upon said connector body for movement lengthwise thereof, said screw rod extending lengthwise of said connector body and cylindrical body, a worm gear supported by said cylindrical body and rigidly fixed to said screw rod, a worm on said cylindrical body operatively positioned with respect to said gear, means for operating said worm and gear arrangement to rotate said screw rod and thereby slide said cylindrical body longitudinally in said connector body, and arms pivotally mounted adjacent the outer end of said cylindrical body for connecting the latter with said pivot members.

12. Means for traversing and processing surface areas comprising a plurality of spaced pivot members positioned over said surface adapted for sequential connection with one or the other end of a processing member, each of said pivot members having at least one other pivot member spaced therefrom a distance equal to the length of the processing member whereby said processing member may be moved over the surface along a predetermined pattern by pivotal movement thereof sequentially about said pivot members.

13. Means for processing a surface area comprising a movable processing member having a fixed length and a pair of spaced connecting members thereon, a central row of spaced pivot members positioned over said surface area, an outer row of spaced pivot members on each side of said central row and parallel thereto and means for supplying processing material to each of said pivot members, the pivot members in one of the outer rows being spaced from alternate pivot members of said central row a distance equal to the distance between said spaced connecting members, the pivot members in the other outer row being spaced from the other alternate pivot members in the central row a distance equal to the distance between said spaced connecting members, each pivot member serving as a source of processing material for said processing member and as a point about which said processing member is pivoted when connected therewith through said connecting members whereby the processing member may be moved over said surface area to apply processing material thereto by sequentially connecting same for pivotal movement about the pivot members of one of the outer rows and alternate pivot members of the central row until the area therebetween has been traversed and then sequentially connecting said processing member for pivotal movement about the pivot members of the other outer row and the other alternate pivot members of the central row to traverse the area therebetween.

14. Apparatus for processing surface areas comprising a plurality of spaced pivot members fixed in said surface, a longitudinal member having means thereon for performing the necessary processing operation, means for motivating said longitudinal member and means at both ends of said longitudinal member for pivotal connection with said pivot members, each of said pivot members having at least one other pivot member spaced therefrom a distance equal to the length of said longitudinal member, whereby said longitudinal member may be moved over said surface along a predetermined pattern by pivotal movement thereof sequentially about said pivot members with first one end of said longitudinal member connected to a pivot member, and then the other end connected to the other pivot member.

15. Apparatus for traversing a surface area comprising a plurality of spaced pivot members fixed in said surface, a longitudinal member, means for motivating said longitudinal member to move the latter transversely of its length and a pair of spaced connecting means on said longitudinal member for pivotal connection with said pivot members, each of said pivot members having at least one other pivot member spaced therefrom a distance equal to the distance between said spaced connecting means whereby said longitudinal member may be moved over said surface along a predetermined pattern by pivotal movement thereof sequentially about said pivot members with first one of the spaced connecting means of said longitudinal member being connected to a pivot member and then the other of said spaced means being connected to the other pivot member.

References Cited in the file of this patent

UNITED STATES PATENTS

| | | |
|---|---|---|
| Re. 804 | Hogel | Aug. 30, 1859 |
| 762,567 | Willett | June 14, 1904 |
| 1,021,529 | Johnson | Mar. 26, 1912 |
| 1,021,530 | Johnson | Mar. 26, 1912 |
| 1,051,199 | Cowart | Jan. 21, 1913 |
| 1,255,777 | Norton | Feb. 5, 1918 |
| 1,278,216 | Reid | Sept. 10, 1918 |
| 1,278,217 | Reid | Sept. 10, 1918 |
| 1,346,843 | Ramen | July 20, 1920 |
| 1,373,660 | Iverson | Apr. 5, 1921 |
| 1,644,970 | Wilson | Oct. 11, 1927 |
| 1,842,175 | Jones | Jan. 19, 1932 |
| 2,327,204 | McLemore | Aug. 17, 1943 |
| 2,408,328 | McLemore | Sept. 24, 1946 |
| 2,419,085 | Newsom | Apr. 15, 1947 |
| 2,604,359 | Zybach | July 22, 1952 |

FOREIGN PATENTS

| | | |
|---|---|---|
| 6,685 | Australia | of 1932 |
| 502,376 | Germany | July 15, 1930 |
| 273,551 | Italy | Apr. 23, 1930 |